Patented Sept. 16, 1924.

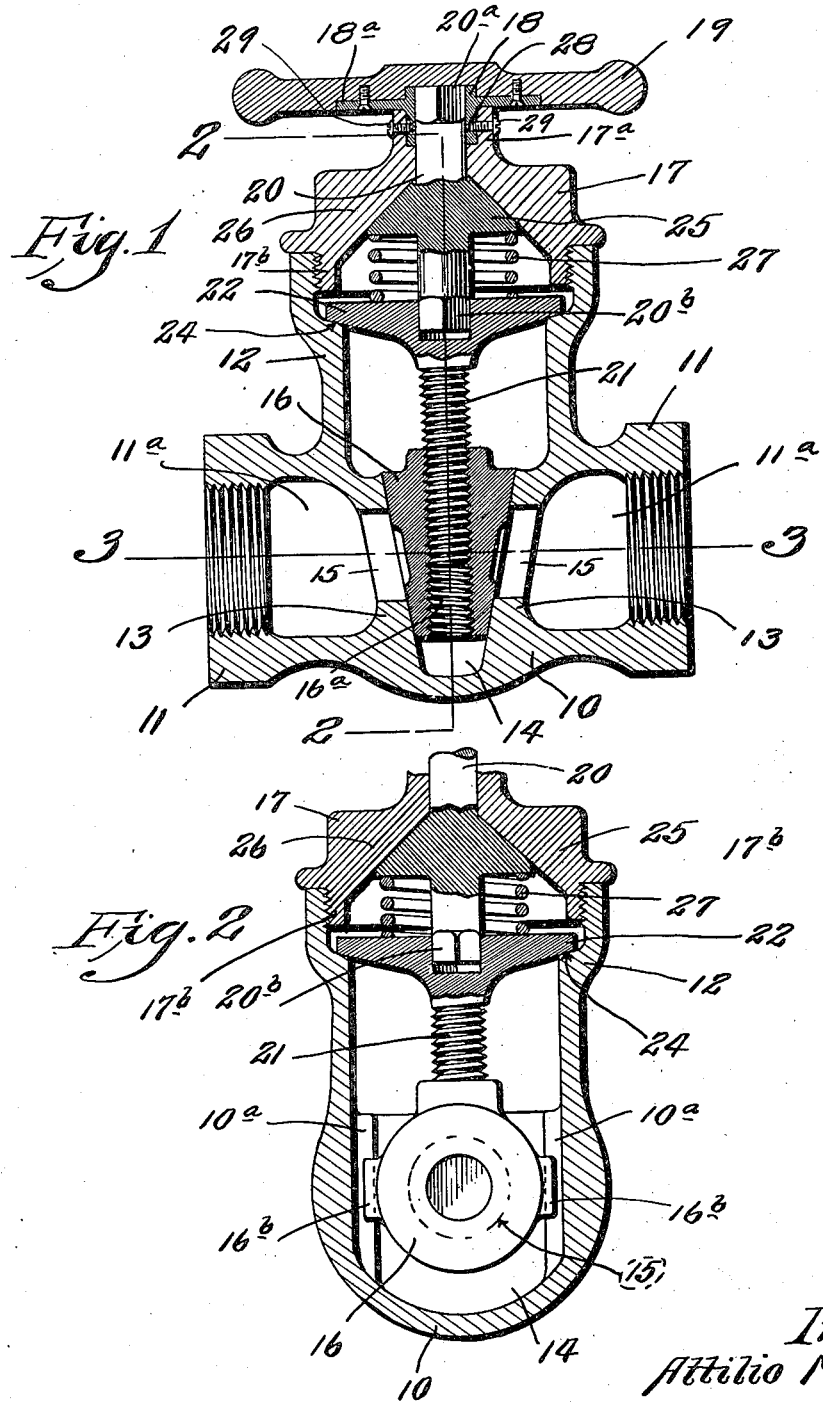

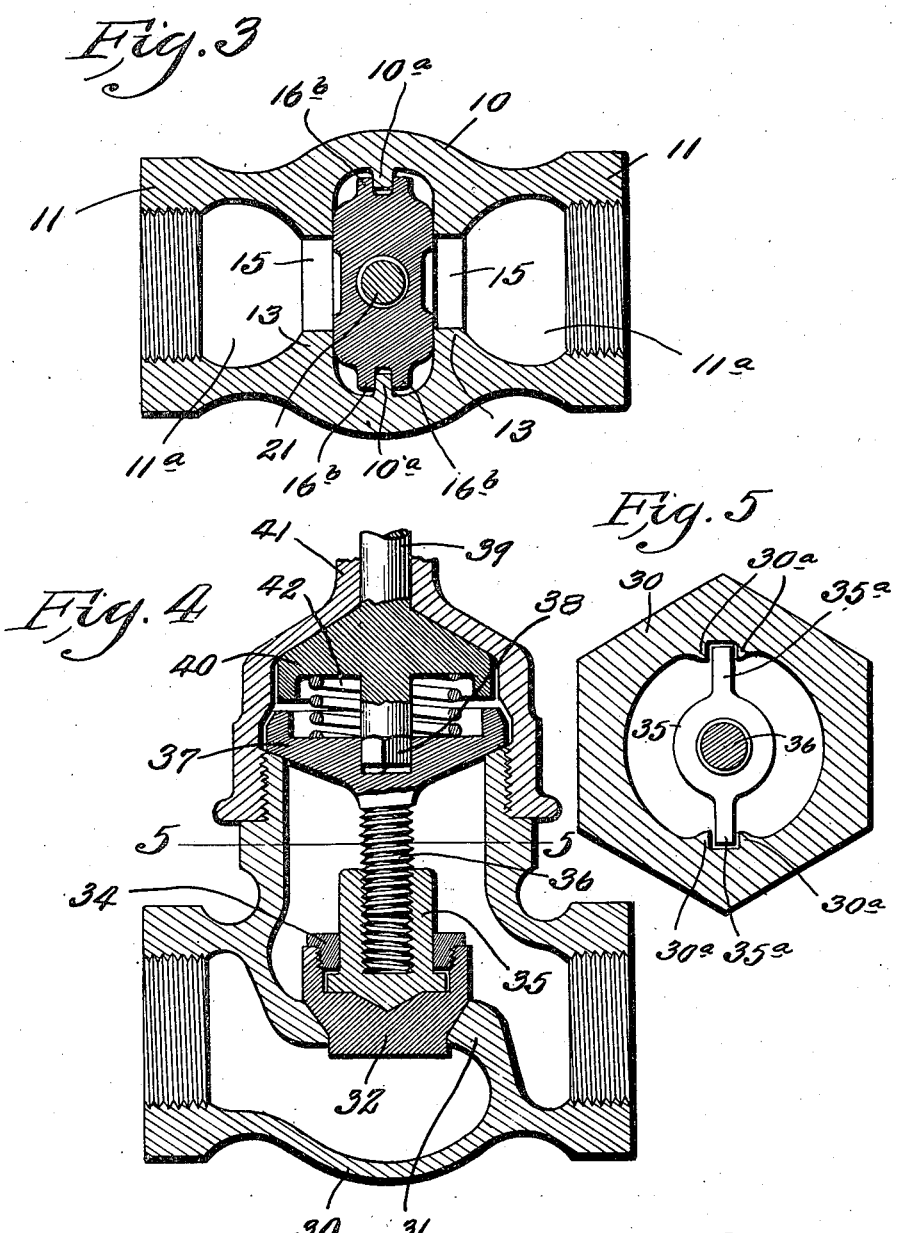

1,508,461

UNITED STATES PATENT OFFICE.

ATTILIO MARCELLI, OF OVERLAND, MISSOURI, ASSIGNOR TO ST. LOUIS TOOL, DIE & MANUFACTURING COMPANY, A CORPORATION OF MISSOURI.

VALVE.

Application filed August 26, 1920. Serial No. 406,148.

*To all whom it may concern:*

Be it known that I, ATTILIO MARCELLI, a citizen of the United States, residing at Overland, St. Louis County, Missouri, have invented a certain new and useful Improvement in Valves, of which the following is a full, clear, and exact description, such as will enable others skilled in the art to which it appertains to make and use the same, reference being had to the accompanying drawings, forming part of this specification.

This invention relates to valves and more particularly to that class of valves used to control fluids or high pressure systems.

The principal object of the invention is to provide a valve which does not require packing to form a fluid tight joint but in which the joint is formed by means of annular flanges or disks carried by the rotating member of the valve and spring-pressed against the seats, formed in the housing and bonnet of the valve.

Other objects of the invention are, to provide a valve which can be readily assembled and applied to existing connections and to provide a valve which is of simple and durable structure, the operating parts of which operate freely without sticking or binding, and which maintains an effective seal and fluid tight joints, thereby making it especially valuable in systems of high pressure.

With the foregoing and other objects in view, my invention resides in certain novel features of construction and arrangement of parts, hereinafter more fully described and claimed, and illustrated in the accompanying drawings, in which—

Figure 1 is a vertical section taken through the center of the valve.

Figure 2 is a vertical section taken on the line 2—2 of Figure 1.

Figure 3 is a horizontal section taken on the line 3—3 of Figure 1.

Figure 4 is a vertical section of a modified form of valve.

Figure 5 is a horizontal section taken on the line 5—5 of Figure 4.

Referring by numerals to the accompanying drawings, 10 indicates the globe or body portion of a valve, said body portion being provided with longitudinal tubular extensions 11 which are internally threaded to receive the threaded ends of pipes used to conduct the fluid. Housing 10 is provided with an annular upward extension 12. The chamber formed in body portion 10 is divided by transverse walls or partitions 13 into chambers 11ª and an open top central chamber 14. The walls 12 are inclined so that chamber 14 is comparatively wide at the top and narrow at the bottom and said walls being provided with central openings 15 which connect chambers 11ª with central chamber 14.

A valve 16, wedge-shaped in cross section, is arranged for vertical movement in chamber 14 and has a vertically disposed threaded opening 16ª. In order to guide valve 16 in its vertical movement, ribs 10ª are vertically disposed on main body portion 10 and engaging these ribs are lugs or ears 16ᵇ projecting outwardly from valve 16 on each side of rib 10ª. The upward extension 12 of housing 10 is internally threaded to receive externally threaded bonnet 17. The upper end of this bonnet is of reduced diameter and forms a boss or bearing 17ª in which is rotatably carried sleeve 18 having a flange 18ª.

A hand wheel 19 is fixed to flange 18ª by screws or other suitable means. Passing through sleeve 18 and rotatably carried in bonnet 17 is a rod 20, the upper end 20ª of which is non-circular in cross section in order to form rotative engagement with sleeve 18. The lower end 20ᵇ of said rod is non-circular in cross section and rests in a non-circular seat or recess formed in the upper end of valve stem 21, which latter is threaded and operates in the threaded opening 16ª of valve 16. The upper end of stem 21 is provided with a disk or annular flange 22, the lower face of which is inclined and rests in a seat 24 formed in the upward extension 12. A disk or annular flange 25 is formed on rod 20 immediately below the central portion of bonnet 17. The upper face of flange 25 is inclined and bears against seat 26 formed in bonnet 17.

An expansive spring 27 is positioned on rod 20 and its ends press against flanges 22 and 25, thus forcing said disks or annular flanges to maintain a tight joint with their respective seats. Sleeve 18 is provided with an annular groove 28 and entering said groove are the ends of screws 29 carried by the boss 17ª on bonnet 17. The ends of screws 29 entering groove 28 in sleeve 18 lock handle 19 and sleeve 18 to bonnet 17 but permit the rotative movement of said hand wheel and sleeve.

In opening the valve, the hand wheel 19 is turned in the required direction whereby sleeve 18 which is fixed to hand wheel 19 is rotated and through its engagement with the non-circular end 20$^a$ of rod 20 rotates said rod. The non-circular lower end 20$^b$ of rod 20 being located in the recess in the threaded valve stem 21, the rotation of rod 20 will cause it to rotate. The lower end of valve stem 21 being threaded and in engagement with the threaded opening 16$^a$ in valve 16 will cause said valve to be raised from its seat, thereby establishing communication between the central openings 15 in walls 10 and central chamber 14, and thus permit the fluid to flow through chambers 11$^a$ and their respective fluid conductors.

In closing the valve, hand wheel 19 is turned in an opposite direction, actuating rod 20 and valve stem 21, thereby seating valve 16, closing openings 15, and thus shutting off communication between chambers 11$^a$.

The arrangement of disk or annular flange 25 on rod 20 and disk or annular flange 22 on valve stem 21 with their inclined faces oppositely disposed and held in close contact with their respective seats by the expansive spring 27, permits the free rotation of rod 20 in valve stem 21 without sticking or binding and maintains a fluid tight joint which is not affected by high temperature or chemicals. The ends of springs 27 pressing against disks 25 and 22 hold said disks in their respective seats under pressure and the tension of the spring will compensate for any wear incurred in the service, thereby maintaining the valve in good working condition at all times.

In Figures 4 and 5 I have shown a modified form of my valve in which the main body 30 has a horizontal wall 31 provided with a central opening in which is seated valve 32. This valve has a threaded annular flange in which is screwed ring 34 which holds in position on valve 32 internally threaded sleeve 35. A threaded valve stem 26 having an annular flange 37 at its upper end screws into the threaded sleeve 35. The non-circular lower end 38 of rod 39 engages said valve stem 36 so that rotation of rod 39 will operate valve stem 36, causing it to raise or lower sleeve 35, thereby seating or unseating valve 32. The annular flange 37 is seated in the upper portion of main body 30 and flange 40 on rod 39 is seated in the bonnet 41 while an expansion spring 42 located on said rod between flanges 37 and 40 maintains said flanges in their seated positions.

The threaded stem 21 is held against upward movement by the threaded annular flange 17$^b$ of the bonnet 17 which flange terminates just above the disk 22 carried by the upper end of the stem 21.

The angle of the inclined faces of the disks 22 and 25 can be varied to suit the proper working conditions and to form the most effective seal.

In order to prevent rotation of valve 32 and to guide it in its vertical movement, sleeve 35 is provided with ears or lugs 35$^a$ which extend radially from said sleeve and are engaged by vertical ribs 30$^a$ projecting inwardly from main body 30.

A valve constructed according to my invention is simple in operation, does not require any packing members or stuffing boxes which are subject to deterioration on account of heat, chemical, etc., and which valve can be readily assembled and as all its parts can be made of metal or other wear resisting material, it has a long period of usefulness.

It will be readily understood that minor changes in the size, form and construction of the various parts of my improved valve can be made and substituted for those herein shown and described without departing from the spirit of my invention, the scope of which is set forth in the appended claims.

I claim as my invention:

1. In a valve, the combination of a housing having inlet and outlet chambers and a valve chamber connecting the same, a valve operating in said valve chamber for controlling the communication between said first-mentioned chambers, a bonnet screw-seated on said housing and having a downwardly presented cone-shaped seat, a rod rotatably mounted in said bonnet, a disk carried by said rod and having a conical upper face adapted to be seated in said cone-shaped seat, a valve stem having threaded engagement with said valve for operating the same and provided in its upper end with a non-circular seat for operatively engaging the non-circular end of said rod, a disk carried by the upper end of said stem and provided with an inclined lower face having a bearing in a seat formed in said housing, and a spring interposed between said disks for holding the latter to their respective seats.

2. In a valve, the combination of a housing having inlet and outlet chambers and a valve chamber connecting the same, a valve operating in said valve chamber for controlling the communication between said first-mentioned chambers, a bonnet screw-seated on said housing and having a downwardly presented cone-shaped seat, a rod rotatably mounted in said bonnet, a disk carried by said rod and having a conical upper face adapted to be seated in said cone-shaped seat, a valve stem having threaded engagement with said valve for operating the same and provided in its upper end with a non-circular seat for operatively engaging the non-circular end of said rod, a disk carried by the upper end of said stem and provided with an inclined lower face having a bearing in a seat formed in said housing, a spring interposed between said disks for holding the latter to their respective seats, and a sleeve rotatably mounted in the upper end of said bonnet and having non-rotative engagement with the upper end of said rod and provided with laterally projecting portions, and a hand wheel secured to said lateral portions.

3. In a valve, the combination of a housing having inlet and outlet chambers and a valve chamber connecting the same, a valve operating in said valve chamber for controlling the communication between said first-mentioned chambers, a bonnet screw-seated on said housing and having a downwardly presented cone-shaped seat, a rod rotatably mounted in said bonnet, a disk carried by said rod and having a conical upper face adapted to be seated in said cone-shaped seat, a valve stem having threaded engagement with said valve for operating the same and provided in its upper end with a non-circular seat for operatively engaging the non-circular end of said rod, a disk carried by the upper end of said stem and provided with an inclined lower face having a bearing in a seat formed in said housing, a spring interposed between said disks for holding the latter to their respective seats, a sleeve rotatably mounted in the upper end of said bonnet and having non-rotative engagement with the upper end of said rod, said sleeve being provided with a peripheral groove, screws detachably arranged in said bonnet and having their ends engaging said groove for retaining said sleeve in position in said bonnet, and a hand wheel secured to said sleeve.

In testimony whereof I hereunto affix my signature this 19th day of August, 1920.

ATTILIO MARCELLI.